J. W. RENO.
FREIGHT CARRIER.
APPLICATION FILED OCT. 12, 1910.
1,018,586.
Patented Feb. 27, 1912.
3 SHEETS—SHEET 1.
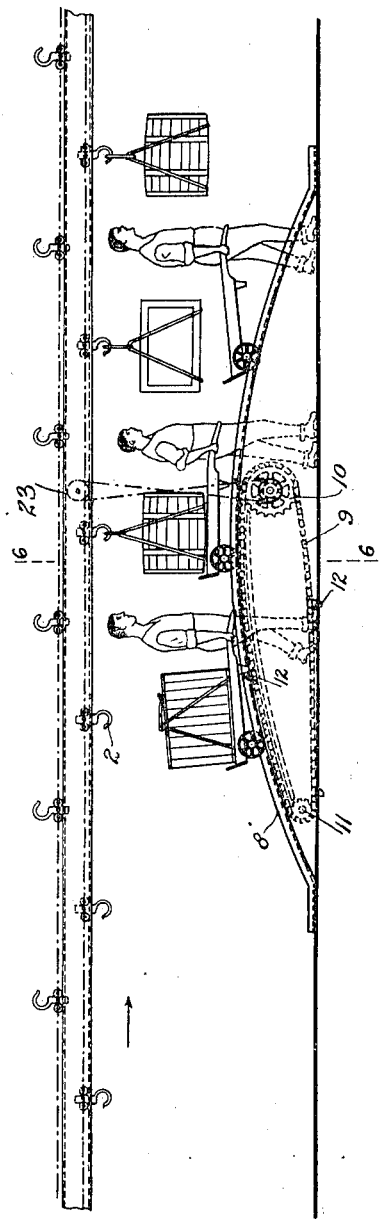
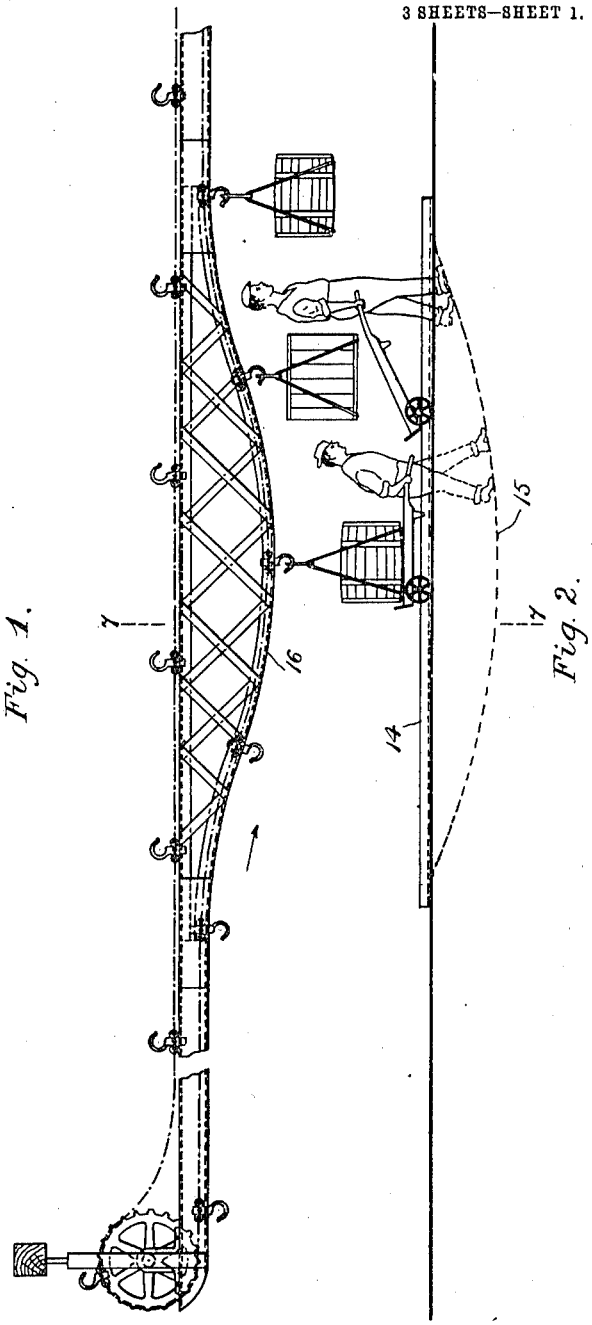
WITNESSES:
John F. Valentine
Ernest Miller
INVENTOR
Jesse W. Reno
BY
Chas. J. Earll,
ATTORNEY J. W. RENO.
FREIGHT CARRIER.
APPLICATION FILED OCT. 12, 1910.
1,018,586.
Patented Feb. 27, 1912.
3 SHEETS—SHEET 2.
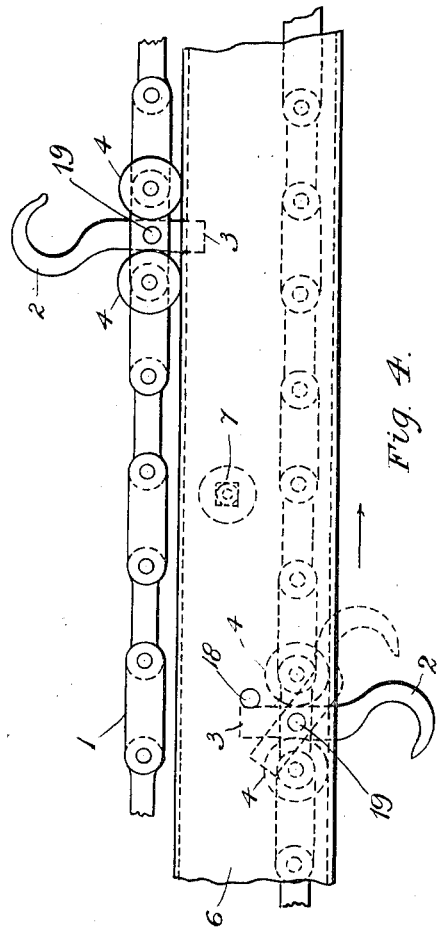
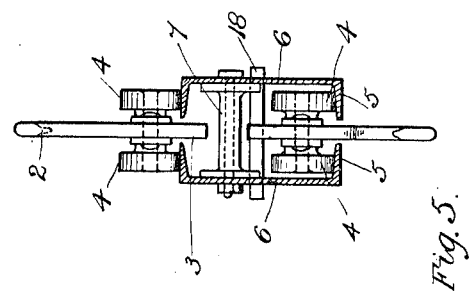
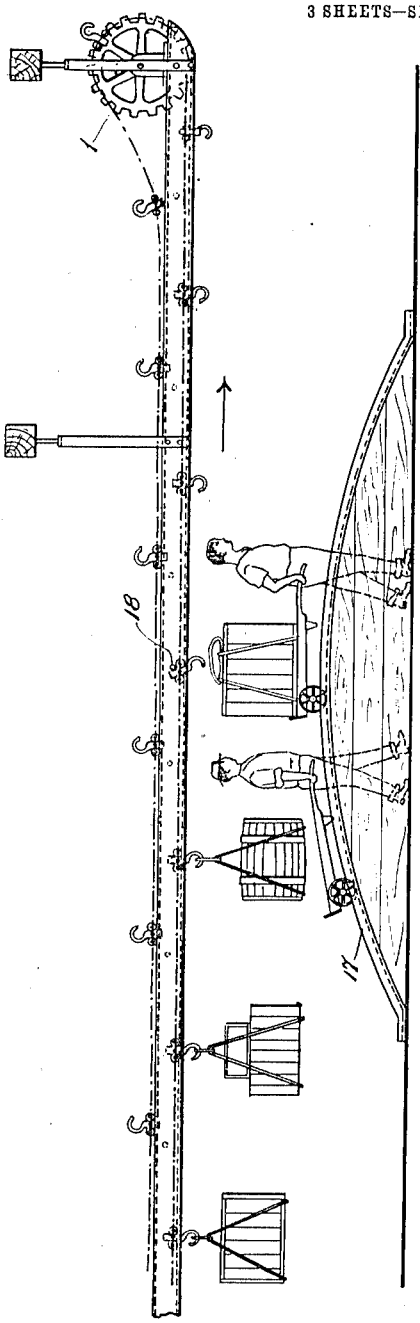
WITNESSES:
John F. Valentine
Ernest Miller
INVENTOR
Jesse W. Reno
BY
Chas. J. Earll.
ATTORNEY

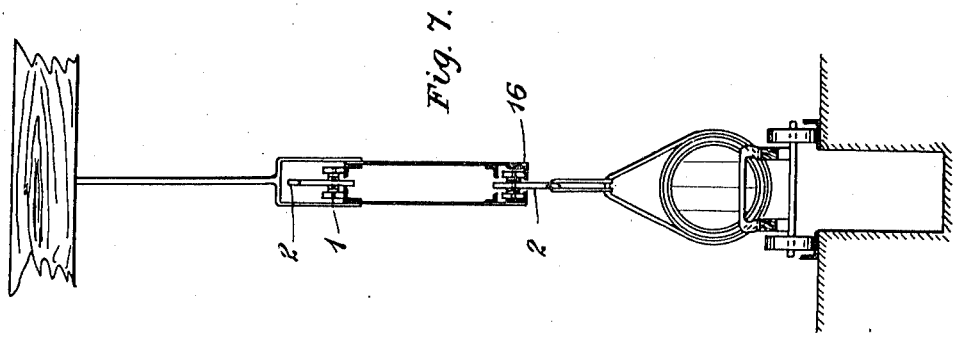
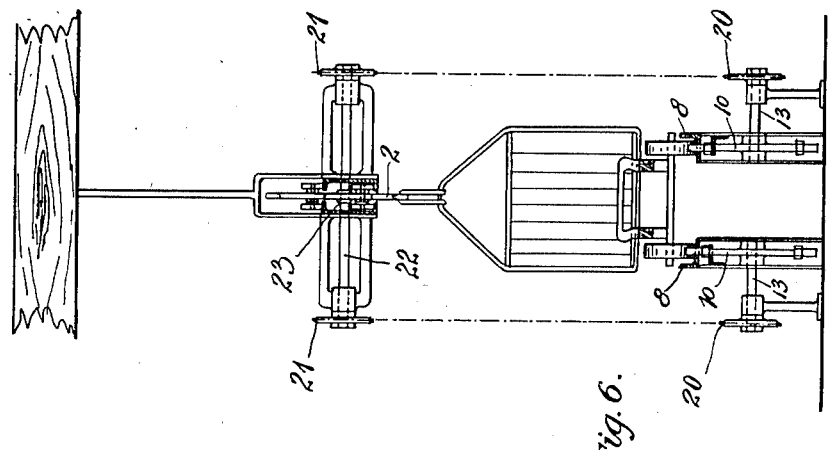

UNITED STATES PATENT OFFICE.

JESSE W. RENO, OF NEW YORK, N. Y.

FREIGHT-CARRIER.

1,018,586.  Specification of Letters Patent.  Patented Feb. 27, 1912.

Application filed October 12, 1910. Serial No. 586,814.

*To all whom it may concern:*

Be it known that I, JESSE W. RENO, a citizen of the United States of America, and resident of the city, county, and State of New York, have invented certain new and useful Improvements in Freight-Carriers, of which the following is a specification.

My invention relates to freight carriers.

The object of my invention is to provide a simple and effective means for carrying or transporting packages of freight on docks or similar places where it is now the common practice to use trucks.

The present method of transporting freight at freight terminals and docks, where relatively long trips have to be made, by means of trucks both going and coming, results in expensive wear and tear on the trucks and on the floors over which the trucks are operated and much time is consumed by the to and fro journeys of the operators which it is the object of my invention to avoid.

Another object of my invention is to provide a mechanical means for transporting packages of freight which shall leave the floor over which said freight is carried practically unobstructed and unaltered by the mechanism employed.

My invention consists in providing an endless chain adapted to be driven by suitable means and to be carried and guided at an elevation above the floor so that the floor is clear for ordinary uses under said chain when freight is not being carried by it; in providing hooks or other engaging means on said chain to which packages of freight may be attached; in providing a simple and convenient means for bringing packages of freight to and engaging them with the carrier chain and for disengaging them from said chain; and in other useful and novel features to be hereinafter more fully pointed out and described.

In the drawings accompanying and forming part of this specification, Figure 1 is a side elevation of the preferred form of my freight carrier at a point where the loading of packages on the carrier takes place; Fig. 2 is a similar view showing a modified construction for the loading point; Fig. 3 is a side view at the place of unloading from the carrier; Figs. 4 and 5 represent, respectively, a partial side view and transverse section on an enlarged scale of the carrier chain and supporting guides for the same; Fig. 6 represents a transverse section on line 6—6 of Fig. 1; and Fig. 7 represents a transverse section on line 7—7 of Fig. 2.

Numeral 1 represents the carrier chain. This is composed of links which may be of any appropriate form. Secured to the carrier chain at intervals, are hooks 2, the points of which I prefer to have face opposite to the direction of movement of the chain for the purpose which will be hereinafter explained. The hooks 2 may be secured rigidly to the chain. I prefer, however, to have them pivoted upon pins 19 and to provide an extension 3 on the side of the pivot opposite the hook, which is adapted to engage a cross-bar or pin 18 secured to the chain carrier guide at the point where it is desired to disengage the hooks from the sling or other suitable means for attaching the freight packages. The cross-bar or pin 18 is located at the point where it is desired to have the disengagement take place and, as will be readily understood, as the chain travels in the direction of the arrow, Fig. 4, the extension 3 will contact the cross-bar 18 and cause the hook 2 to tilt to a position which will permit the sling to automatically slip or drop away therefrom. The extension 3 also forms a guide to keep the chain in position on its return travel. The links adjacent to the hooks 2 are provided with traction wheels 4 which travel upon the flanges 5 of the channel bars 6. The channel bars 6 form the guide and support for the carrier chain on the main portion of both its forward and return travel; the forward travel being supported on the lower flanges and the return travel on the upper flanges. The webs of the channel are vertical and are held in relative positions by separators 7 secured at intervals between the channels in the manner shown. The packages of freight are brought to the loading point by trucks of the usual construction and a sling made of rope, or other suitable device, adapted to engage the hooks 2, or other suitable engaging means, are secured to the freight packages. At the loading point the height of the carrier guide is preferably such that operators may walk freely under it. At other points it may be carried at any height desired.

In order to bring the trucks carrying freight packages into operative relation with the carrier chain, I provide curved tracks 8 adapted to receive the truck wheels located directly under the carrier chain at the loading point. These tracks are curved upward to an elevation to bring the sling into engagement with one of the hooks 2 of the chain, and a space is left between the tracks through which the operator may pass while guiding and controlling the forward end of the truck. In order to bring the loaded truck up the incline of the tracks 8, I provide chains 9 operating on the sprocket wheels 10 and 11, which chains have lugs 12 secured thereto adapted to engage the truck. The sprocket wheels 10 are secured to the shafts 13. The chains 9 may be driven by means of a motor geared to the shafts 13 or any other convenient manner, at a speed uniform with that of the travel of the chain 1, and the lugs 12 are so spaced on the chain 9 that trucks shall always be brought up the incline in the proper relation, or at the proper time with respect to the passage of the hooks, so that the engagement of the sling with a hook may be readily and conveniently made; or the chain 9 may be geared directly to the carrier chain 1, as illustrated in Figs. 1 and 6, by securing chain wheels 20 to the shafts 13 and providing chain wheels 21 on the shaft 22 and a chain wheel 23 on the shaft 22 which is engaged by the chain 1 and driven thereby. After engagement with the lugs 12, the operator continues and allows the truck to travel down the incline of the curved tracks while the package is sustained and carried by the carrier.

In the modified construction shown in Fig. 2, the tracks 14 for the trucks are straight and substantially in the plane of the floor, and a depressed passage 15 is formed in the floor for the operator. At the same time a curved supporting guide 16 is provided to bring the carrier chain low enough to permit the sling to engage the hooks. At the points where the unloading of the carrier chain takes place, I provide curved tracks 17, having a passage between them for the operator, preferably constructed so that they may be moved from one point to another so that the unloading may take place at any desired point along the line of the carrier. These tracks are arranged to lift the trucks to such height as will permit the disengagement of the slings from the hooks. Inasmuch as for the major and steeper portion of the incline, the operator has merely to haul the empty truck, no mechanical power is needed for unloading ordinary loads. Where it is desired to unload extraordinary loads, the same means as those employed to load may be used.

Having thus described my invention what I claim is:

1. In a freight carrier the combination with an endless chain having engaging means secured thereto at intervals, of a track for said chain, a track for trucks a distance beneath the path of said engaging means, a curved portion in one of said tracks to bring them into closer relation at said curved portion, and a floor or passage-way for operators below the plane of the track for trucks at said curved portion.

2. In a freight carrier the combination with an endless chain having engaging means secured thereto at uniform intervals, of an elevated support for said chain, and an inclined truck elevating means adapted to bring trucks into operative relation with said chain at a predetermined time with respect to the movement of the engaging means on said chain and located at a distance beneath said engaging means.

3. In a freight carrier the combination with a pair of channel bars arranged to have their webs vertical and their flanges in alinement and spaced a distance apart, of an endless carrier chain adapted to travel in one direction upon the lower flanges of said channel bars and in the return or reverse direction upon their upper flanges.

4. In a freight carrier the combination with a pair of channel bars arranged to have their webs vertical and their flanges in alinement and spaced a distance apart, of an endless carrier chain adapted to travel in one direction upon the lower flanges of said channel bars and in the return or reverse direction upon their upper flanges, and extensions or lugs secured to said chain extending between the adjacent edges of said flanges to guide said chain laterally.

5. In a freight carrier the combination with a traveling chain and a guide therefor, of a hook pivoted to said chain having its point face in the direction opposite to the movement of the chain, a track or way for trucks arranged beneath said chain, having an elevated curved portion adapted to elevate the truck to a predetermined height in relation to said chain, and means for tilting said hook on its pivot in the direction opposite to that in which the hook points.

In testimony whereof, I have signed my name to this specification in the presence of two subscribing witnesses.

JESSE W. RENO.

Witnesses:
 MURRAY HILL,
 JOHN F. VALENTINE.